July 7, 1959 W. G. SHOLLENBERGER 2,893,499
BLADE MOUNTING FOR A TILLAGE TOOL
Filed Sept. 21. 1955
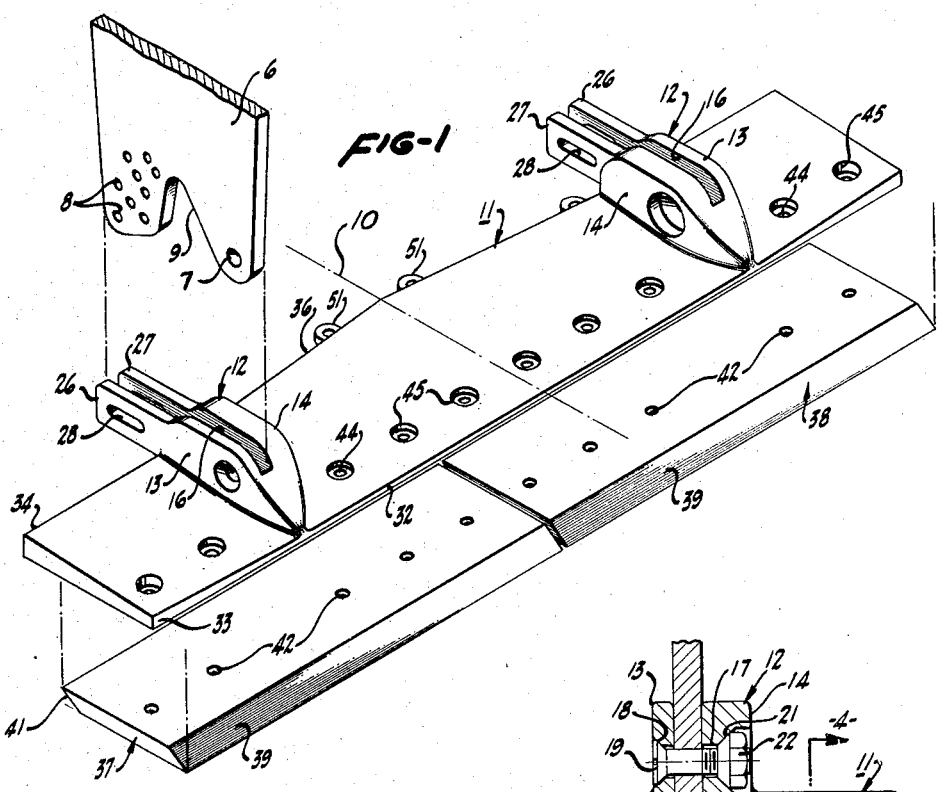
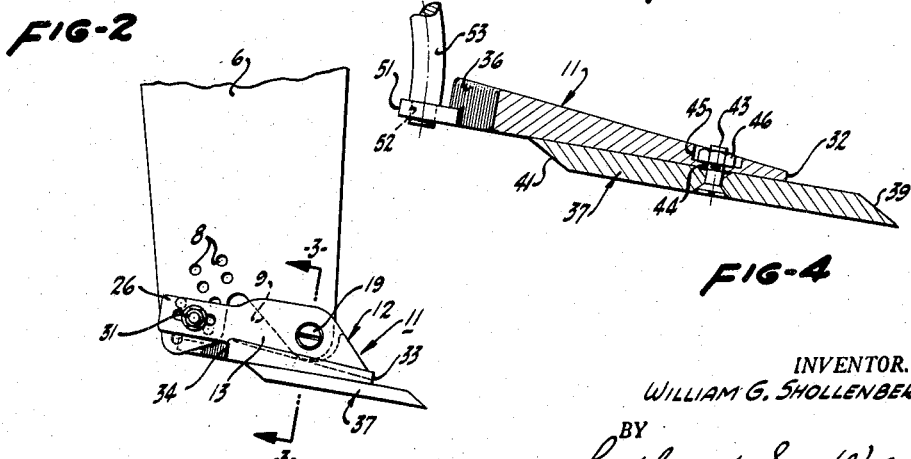
INVENTOR.
WILLIAM G. SHOLLENBERGER
BY
Lothrop & West
ATTORNEYS United States Patent Office 2,893,499
Patented July 7, 1959

2,893,499

BLADE MOUNTING FOR A TILLAGE TOOL

William G. Shollenberger, Gilroy, Calif.

Application September 21, 1955, Serial No. 535,681

1 Claim. (Cl. 172—740)

My invention relates particularly to earth working implements and is especially concerned with a machine which usually is drawn behind a tractor and includes a cutting blade disposed in a substantially horizontal attitude and pulled through the ground at a substantial distance below the surface thereof not only for severing roots and the like during land clearing but also for shifting soil at a location considerably deeper than reached by the usual plow. Devices of this kind are shown in the patents to Austin, 2,190,347 and Shollenberger 2,292,904, and have been successfully used under extremely severe conditions of operation. Because of the adverse environment, the blade structure is susceptible to some difficulties and normally has a relatively short life.

It is therefore an object of my invention to provide a blade mounting for such a tillage tool with a considerably extended life even under adverse conditions.

Another object of my invention is to provide a blade mounting readily arranged for adjustment of the tilling blade.

Another object of my invention is to provide a blade mounting in which the blade securing and adjusting structure is well protected from deleterious influences.

Another object of my invention is to provide a blade mounting especially useful in connection with removal of severed roots from the soil.

Another object of the invention is to provide a blade mounting having a reduced resistance to propulsion through the soil.

Another object of my invention is to provide a blade mounting which is easily and economically fabricated.

A still further object of my invention is, in general, to provide an improved blade mounting for a tillage tool.

These objects, together with others, are attained in the embodiment of the invention described in the accompanying description and illustrated in the accompanying drawings, in which Figure 1 is an isometric view of a blade mounting constructed in accordance with my invention, certain parts being in exploded position and some parts being omitted for clarity.

Figure 2 is an end elevation of the structure shown in Figure 1 but in assembled relationship.

Figure 3 is a detailed cross section to an enlarged scale, the plane of section being indicated by the line 3—3 of Figure 2.

Figure 4 is a cross section, the plane of which is indicated by the line 4—4 of Figure 3.

The tillage tool with which the present structure is normally utilized and which is illustrated in the mentioned patents includes a framework (not shown) having a pair of trailing and depending supports 6 located either side of a central plane represented by a center line 10 in Figure 1. Each of the supports 6 is symmetrically disposed with respect to the center plane and comprises a metallic depending plate having an opening 7 adjacent its lower, leading corner and also having a plurality of appropriately spaced openings 8 adjacent its lower, trailing corner. Intermediate those corners the supports 6 has a re-entrant portion 9.

Pursuant to the invention, there is provided a blade mounting effective for use with the supports 6. This mounting is preferably a plate-like member 11 conveniently fabricated by casting in manganese steel which has a long wearing characteristic under the impact of subsoil operation. In order to provide a substantial member which is not wracked by adverse use, the plate member is preferably cast integrally with a number of appurtenances. The plate member is likewise made symmetrical about the central plane 10 so that herein a description of the blade mounting on one side of the plane 10 applies equally to the construction on the other side of such plane.

The plate member at a convenient distance from the central plane 10 has integrally formed therewith an upstanding bifurcated pivot mounting 12. This mounting converges forwardly and downwardly to constitute a substantially "streamlined" leading portion which widens as it extends rearwardly to afford between the bifurcated parts 13 and 14 thereof a central slot 16. This slot is of substantially the full depth of the pivot mounting but is not symmetrically disposed between the relatively smooth envelope contour of the pivot mounting. Rather, it is disposed toward the outside or away from the central plane 10. The slot 16 is designed readily to accommodate the support 6 with the opening 7 approximately in line with a transverse bore 17 (Fig. 3). The bore is enlarged in the portion 13 to afford a frustoconical socket 18 for receiving the head of a bolt 19 whereas the bore in the portion 14 is enlarged conically and cylindrically to provide a socket 21 designed to receive a nut 22 engaging the bolt 19. The transverse width of the upstanding bifurcated pivot mounting 12 is sufficient so that the nut 22 and bolt are well within the envelope contour of the mounting. As the mounting travels through the earth, the nut and bolt are well protected, yet serve readily as a pivot connection between the blade mounting and the support 6.

The integral pivot mounting not only lies across the top of the plate member 11 but continues its bifurcated construction in rearwardly extending trailing portions 26 and 27 each of which is pierced by a transverse perforation 28 of sufficient height to receive a bolt but of extended length to receive the bolt in any of several positions. To engage in the perforations 28 and any selected one of the openings 8, there is provided a nut and bolt combination 31. This is variably positioned so that the plate 11 assumes and retains an attitude at the selected angle relative to the support 6 for appropriate travel through the earth.

By withdrawing the nut and bolt assembly 31 and since the bolt 19 is a little loose in its mountings when the nut 21 is slightly loosened, the perforations 28 can be put into registry with any one of the openings 8 and then secured in position by the reintroduction of the nut and bolt assembly 31 and the tightening of the nut 22. All of this construction is well within the smoothly contoured envelope of the pivot mounting so that the earth passing around the parts is primarily in contact with the leading portion 12 only and abrasive wear on the mounting and adjusting structures does not occur except very slowly. The parts are well protected from battering by rocks or other obstacles in the earth so that they are not easily beaten out of shape or otherwise rendered inoperative.

The plate member 11 along its leading edge 32 is made relatively thin between the two pivot mountings 12 but between each pivot mounting and outboard end of the plate member, the leading edge 32 is gradually increased in thickness so that the end leading corner 33 is considerably thicker than the central portion. This is for the reason that the extended edge 32 is exposed to additional battering and wear and consequently is substantially strengthened by this means.

The end portion of the trailing edge 34 is made somewhat thicker than the leading edge adjacent the corner 33 insofar as it extends into the pivot mounting. From the pivot mounting toward the central plane 10, the central portion 36 of the trailing edge 34 is increased substantially in thickness and is extended rearwardly to afford augmented beam strength for the plate member between the mountings 12. This is for the reason that the plate member must be raised and lowered through the earth from time to time and then and when it is being drawn often encounters heavy roots, rocks, boulders and the like and is consequently centrally enlarged to increase substantially its stiffness under great load.

The blade mounting is utilized in connection with one or more blades 37 and 38 constructed somewhat along the usual lines and having a sharpened edge 39 along one boundary and another sharpened edge 41 along the other boundary. The blades 37 and 38 may be constructed as one member but conveniently are divided about at the central plane 10 for ease in fabrication and replacement since they can, in this fashion, be turned end for end, shifted transversely or revolved. Each of the blades 37 and 38 is provided with a row of holes 42 for the reception of fastening bolts 43 and correspondingly the mounting plate 11 is likewise provided with a transverse row of apertures 44 enlarged into recesses 45 for receiving the nuts 46 which go with the bolts 43. In this instance also, the bolts and nuts are substantially recessed in the blades 37 and 38 and the mounting plate 11 so that the wear thereon and battering effects due to obstacles in the earth are substantially obviated. Conveniently, the row of apertures 42 is disposed along the transverse center of the mounting plate 11 so that when the blades 37 and 38 are reversed, they project the same distance.

In use the blades 37 and 38 are often effective to sever roots of brush or other plants and I, therefore, provide means for assisting in removing such roots from the earth after they have been severed. For that reason, along the trailing edges 34 and 36 of the plate 11, I provide at intervals integrally cast loops 51 defining central openings 52. These can be used two ways. Separate, shouldered rods 53 can be set into the loops to extend upwardly and rearwardly toward the surface of the earth. Alternatively, several rods can be welded to a strap secured in place by bolts passing through the loops. Roots which are severed and which might tend otherwise to extend crosswise come into contact with the upwardly extending rods 53 and are cammed up toward the surface as the rods advance. The rods 53 are not utilized in all operations and, hence, are readily detached or withdrawn from the loops 51. In either use, the loops 51 are well within the envelope contour of the blade mounting and do not in any wise interfere with the operation of the structure and are themselves protected from serious erosion.

With the blade mounting constructed in accordance with my invention and cast integrally of manganese steel, I have been able, in practice, to get a greatly increased life out of the structure compared with previous designs. When pulled by the most powerful tractors now commercially available there is no substantial distortion of the blade mounting and no serious injury or deterioration over protracted periods of use. Even so, the mounting is readily adjustable for different operating conditions and, with or without its blades 37 and 38, can be entirely removed from the draft unit by a very simple field operation. The mounting itself is stiff enough and rigid enough despite adverse conditions of use so that relatively thinner wearing blades 37 and 38 can be utilized. I have thus provided a generally improved blade mounting for tillage tools.

What is claimed is:

A blade mounting for a tillage tool adapted to be trailed behind a tractor comprising a plate member symmetrical about a central plane and having a leading edge and a trailing edge and formed with a substantially planar bottom face to receive a blade, the top face of said plate member having on each side of said central plane an upstanding bifurcated pivot mounting extending across said top face from said leading edge and formed with a smooth envelope contour flaring outwardly and upwardly from said leading edge and having a transverse bore and sockets for the reception of a bolt and nut within said envelope contour and with transverse perforations for the reception of a positioning bolt, said leading edge being thin between said pivot mountings and being thickened from said pivot mountings toward the ends of said plate member, and said trailing edge being relatively thick and further thickened toward said central plane, and said plate member having a transverse row of apertures near said leading edge for the reception of fastening bolts for said blade disposed against said bottom face.

References Cited in the file of this patent

UNITED STATES PATENTS

| | | |
|---|---|---|
| 1,130,655 | Andrew | Mar. 2, 1915 |
| 1,438,857 | Reinsmith | Dec. 12, 1922 |
| 1,987,268 | Roby | Jan. 8, 1935 |
| 2,154,970 | Briggs | Apr. 18, 1939 |
| 2,322,115 | Cox et al. | June 15, 1943 |
| 2,323,412 | Noble | July 6, 1943 |
| 2,576,361 | Rath | Nov. 27, 1951 |

FOREIGN PATENTS

| | | |
|---|---|---|
| 495,980 | Canada | Sept. 8, 1953 |